United States Patent
Raines et al.

[19]

[11] Patent Number: 5,975,872
[45] Date of Patent: Nov. 2, 1999

[54] DIRECT DRIVE INJECTION MOLDING APPARATUS

[75] Inventors: Richard T. Raines; Michael J. Watkins, both of Aurora, Ill.

[73] Assignee: Illinois Precision Corp., Wheaton, Ill.

[21] Appl. No.: 09/064,961

[22] Filed: Feb. 23, 1998

[51] Int. Cl.⁶ .................................................. B29C 45/06
[52] U.S. Cl. ........................................... 425/136; 425/576
[58] Field of Search ................................... 425/576, 574, 425/575, 136

[56] References Cited

U.S. PATENT DOCUMENTS

| | | |
|---|---|---|
| 3,144,683 | 8/1964 | Vogt . |
| 3,820,578 | 6/1974 | Staba . |
| 4,053,273 | 10/1977 | Karobath et al. . |
| 4,070,940 | 1/1978 | McDaniel et al. . |
| 4,133,622 | 1/1979 | Braun . |
| 4,144,010 | 3/1979 | Fenner . |
| 4,269,588 | 5/1981 | Nogai . |
| 4,330,257 | 5/1982 | Rees et al. . |
| 4,402,389 | 9/1983 | Adams et al. . |
| 4,527,684 | 7/1985 | Eggeman et al. . |
| 4,547,140 | 10/1985 | Davis . |
| 5,153,007 | 10/1992 | Watkins . |
| 5,286,186 | 2/1994 | Brown et al. . |
| 5,320,511 | 6/1994 | Woerner . |

*Primary Examiner*—Tim Heitbrink
*Attorney, Agent, or Firm*—Welsh & Katz, Ltd.

[57] ABSTRACT

A rotary injection molding apparatus includes a stationary frame and a rotatable platform disposed on the frame. The apparatus includes a drive assembly for rotatably driving the platform. The drive assembly includes an indexing motor having a rotating portion that is directly and rigidly operably connected to the platform to define a one-to-one relation between rotation of the motor rotating portion and the platform. The apparatus includes a plurality of mold blocks located on the platform and injection means disposed above the platform for injecting a moldable material into the mold blocks. The apparatus includes a lift portion operably connected to the indexing motor and actuatable to raise and lower the rotatable platform relative to the injection means. The apparatus includes a control system that is operably connected to the motor and operably connected to at least one sensor that is configured to generate a signal and transmit the signal to the control system to, in turn, generate a stop signal to stop movement of the motor and the platform.

8 Claims, 2 Drawing Sheets

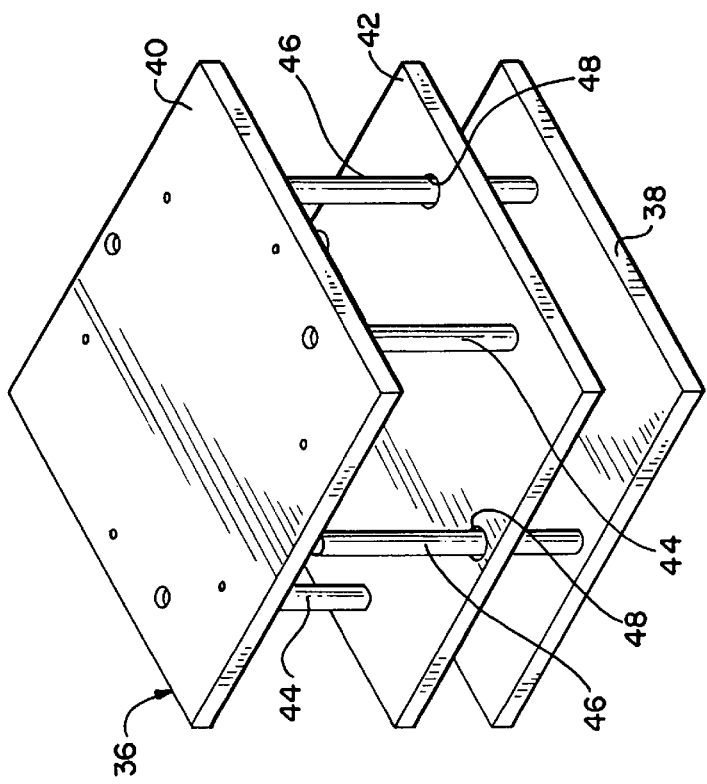
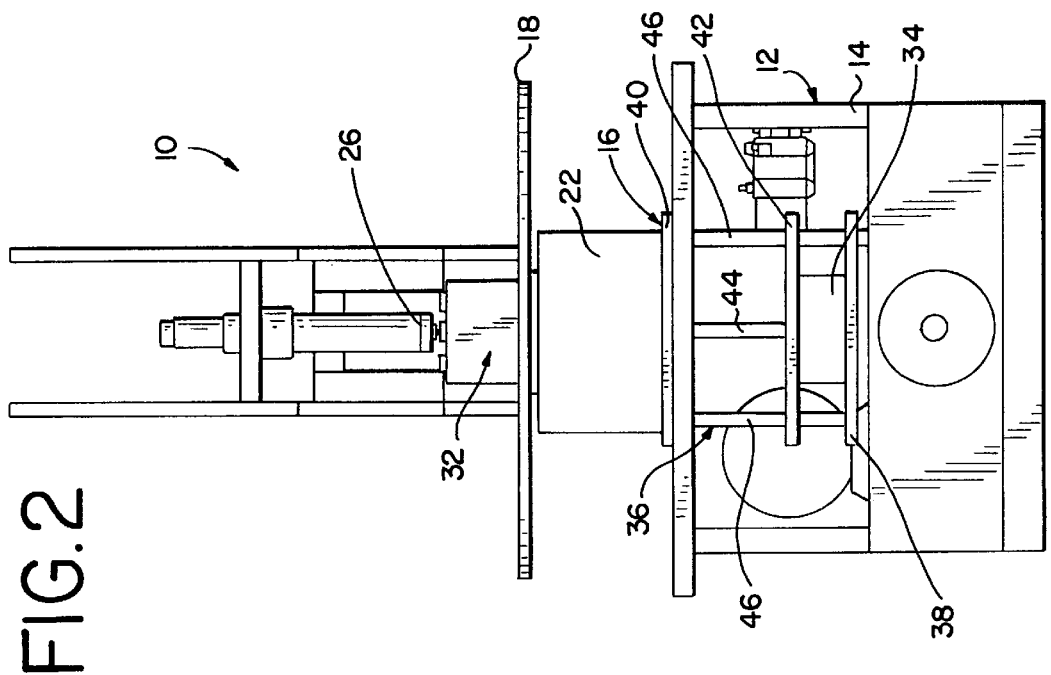

DIRECT DRIVE INJECTION MOLDING APPARATUS

FIELD OF THE INVENTION

This invention pertains to turntable-type injection molding machines. More particularly, this invention pertains to turntable-type injection molding machines having a direct drive system for rotating the turntable.

BACKGROUND OF THE INVENTION

Injection molding is often used for molding small plastic articles, such as components for electrical connectors. In a typical rotary injection molding press, a series of mold blocks are mounted in a circumferential manner on a rotatable platform or table. An injection mechanism is fed with solid plastic, usually in pellet form. The injection mechanism typically heats the plastic into a semi-fluid state and a reciprocating screw element forces the semi-fluid plastic under pressure through an injector nozzle into the cavity of a properly positioned mold block. The mold blocks are typically formed having a bottom or base portion secured to the rotatable platform and a hinged top portion that can be opened to remove the molded plastic article from the mold cavity.

In operation of a typical molding apparatus, an opened mold block is positioned in a preparation station where components can be inserted into the mold block and the mold block is closed. The closed mold block is then positioned, by indexing, in an injection station. In the injection station, the reciprocating screw is engaged and the mold block is injected with the semi-fluid plastic. After a mold block has been filled with plastic, the platform is indexed to position the next mold block under the injection mechanism. As the platform is rotated in this indexing fashion, the previous mold block is positioned at a curing station where the fluid plastic within the mold cavity is allowed to heat and harden to form the desired plastic article.

The platform is then indexed to an eject station where the hinged mold is opened and the molded plastic article is removed from the mold block. This indexed rotation of the mold blocks on the rotatable platform continues, thus resembling a circular assembly line for molding plastic articles.

One common problem associated with rotary injection molding is that of how to control the speed and positioning, e.g., indexing, of the rotatable platform. This, consequently, results in a potential inability to immediately stop the rotatable platform upon a predetermined stop signal.

In a typical injection molding apparatus, the drive motor drives the rotatable platform through a series of belts and/or gears. The drive assembly thus provides indirect drive of the turntable. Although such an arrangement has worked sufficiently for known apparatus, after a "break-in" period, the drive assemblies often require readjustment in order to assure that the mold blocks are correctly positioned at their respective stations during operation. Additionally, although such indirect drive assemblies function well, there exists the possibility that even after receipt of a stop signal, the platform may continue to rotate a small, incremental amount, which can result in equipment damage and/or personnel hazards.

Accordingly, there continues to be a need for a rotary injection molding press that incorporates a direct drive arrangement for driving or rotating the rotatable platform. Such a drive arrangement provides precise, direct control of platform movement, and reduces or eliminates post "break-in" maintenance and adjustment of the press drive system.

BRIEF SUMMARY OF THE INVENTION

A rotary injection molding apparatus includes a stationary frame and a rotatable platform disposed on the frame. The apparatus includes a drive assembly for rotatably driving the platform. The drive assembly includes an indexing motor having a rotating portion that is directly and rigidly operably connected to the platform to define a one-to-one relation between the rotation of the motor rotating portion and the platform.

The apparatus includes a plurality of mold blocks located on the platform and injection means for injecting a moldable plastic material into the mold blocks.

The apparatus further includes a lift portion operably connected to the indexing motor and actuatable to raise and lower the rotatable platform relative to the injection means.

In a preferred embodiment the apparatus includes a control system that is operably connected to the motor and operably connected to at lease one sensor that is configured to generate a signal and transmit the signal to the control system which in turn generates a stop signal to stop movement of the motor and the platform. In a most preferred arrangement the apparatus includes a lift table that is mounted to the frame and the indexing motor for raising and lowering the indexing motor relative to the frame. Preferably, the indexing motor is a servomotor. Most preferably, the lift table is operably connected to a lift cylinder for raising and lowering the indexing motor.

In one embodiment, the apparatus lift table includes a stationary plate and a pair of movable plates disposed above the stationary plate. The stationary plate has the lift cylinder positioned thereon between the stationary plate and an adjacent, lower movable plate. The movable plates are rigidly connected to one another by a plurality of rigid struts and the stationary plate includes at least one aligning strut extending therefrom and extending through an opening defined in the lower movable plate.

The present direct drive assembly advantageously provides extreme control of the movement of the rotatable platform. The present system permits immediately stopping the turntable upon receipt of a stop signal. That is, the rotatable table stops immediately in its position regardless of the position or state of the mold blocks. Such enhanced control of the rotatable table movement increases personnel safety protection, while providing increased responsiveness. In addition, the direct drive system reduces maintenance and adjustment as a result of "breaking-in" of the system.

Other features and advantages of the present invention will be apparent from the following detailed description, the accompanying drawings, and the appended claims.

BRIEF DESCRIPTION OF THE DRAWINGS

FIG. 2 is a simplified front view schematic illustration of the injection molding apparatus of FIG. 1 having portions of the apparatus removed for clarity of illustration; and FIG. 3 is a perspective view of a lift table used in the apparatus of FIG. 1 on which a direct drive motor (not shown) is mounted.

DETAILED DESCRIPTION OF THE PREFERRED EMBODIMENT

Figure 1:
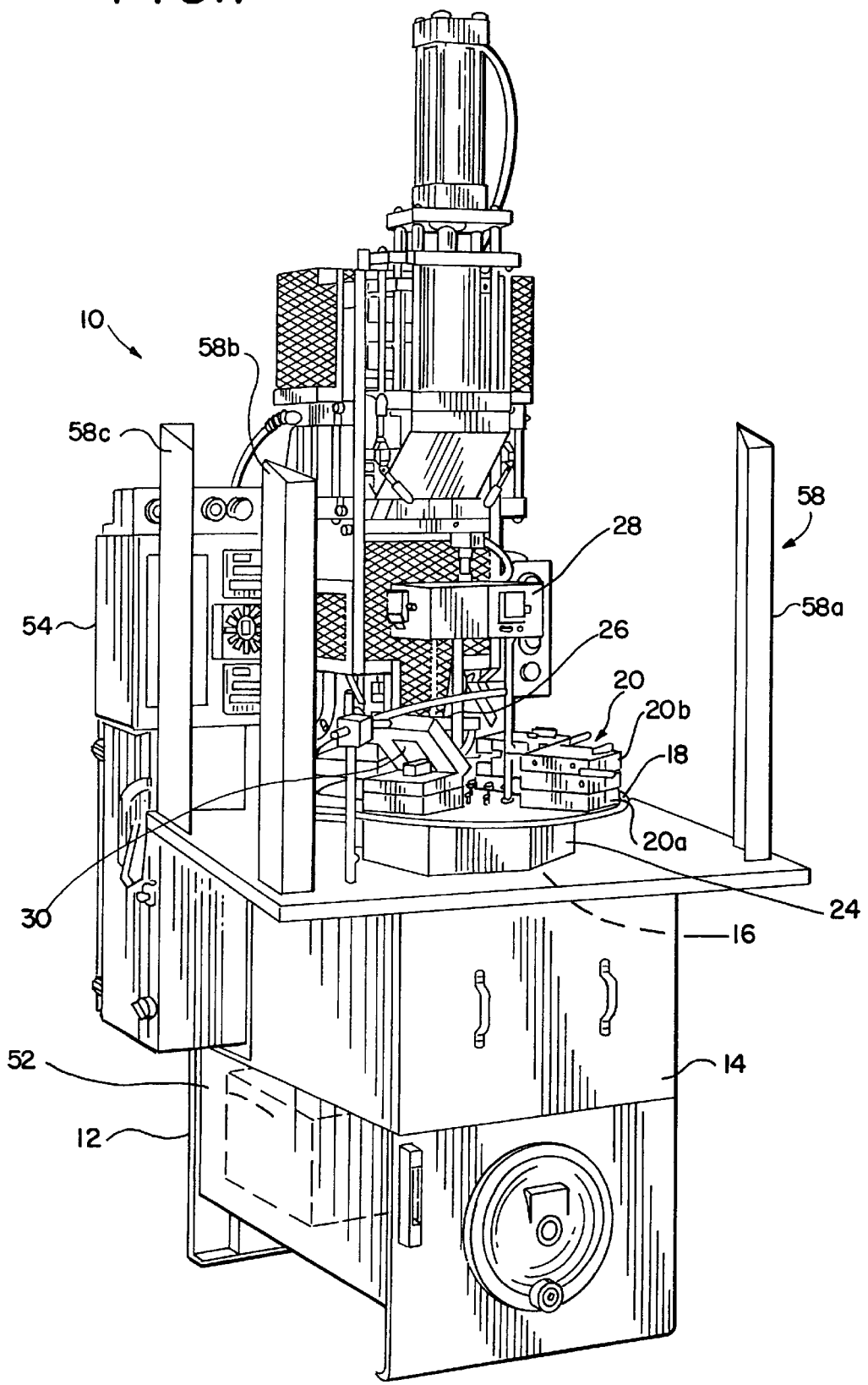
FIG. 1 is a perspective view of a direct drive injection molding apparatus embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Referring now to the figures, and particularly to FIG. 1, there is shown a rotary injection molding apparatus or press 10 embodying the principles of the present invention. The apparatus 10 includes an upstanding frame 12, a portion of which includes a lower cabinet 14 which houses the hydraulics necessary for operation of the press 10 as well as a direct drive assembly 16 and various electronics for the press 10.

A circular rotatable platform or turntable 18 is horizontally disposed on the press 10 as shown. The platform 18 includes one or more mold blocks 20, only four of which are shown in the figures. The press 10 includes a direct drive motor 22 positioned under the platform 18 that is part of the drive assembly 16. The motor 22 provides for, in one embodiment of the invention, clockwise rotation of the platform 18 in a controlled, variable manner. As seen in FIG. 1, the press 10 includes a shroud or protective cover 24 that surrounds the motor 22. FIG. 2, which illustrates the press 10, and which is shown with portions of the press 10 including the shroud 24 removed, shows the relative positioning of the frame 12, motor 22 and platform 18.

As the platform 18 rotates in an indexed fashion, each of the individual mold blocks 20 are positioned under an injector mechanism 26 to inject a particular mold block 20 with the molten plastic. The platform 18 then transports each mold block 20 in a controlled manner, through the several stations of the press 10 described above. Details of the operation of the injection molding press 10 are disclosed in U.S. Pat. No. 4,547,140 to Davis and U.S. Pat. No. 5,153,000 to Watkins, which patents are commonly assigned herewith and are incorporated herein by reference.

The press 10 may include a temperature controller box 28 mounted on the top surface of the platform 18 which controls the temperature of the individual mold blocks 20.

Each of the mold blocks 20 has a bottom portion 20a which is secured to the platform 18 and a top portion 20b which is hinged to the bottom portion 20a to allow for a pivoting opening and closing movement of the mold blocks 20. A mold cavity 30, which is adapted to be filled with fluid plastic and form the desired finished plastic article, is disposed in one or both portions of the mold block 20. The mold blocks 20 may include heater cartridges (not shown) to control the temperature of the mold blocks 20 during the molding operation.

Referring to FIG. 2, unlike known injection molding presses, the present press 10 uses a direct drive system. That is, the drive motor 22 is rigidly mounted to the rotatable platform 18, and preferably, directly mounted thereto. The direct drive configuration provides a one-to-one relation between the rotation of the motor 22 rotating portion and the platform 18. This arrangement provides for increased control of the movement of the platform 18, relative to direction, incremental movement and speed. In addition, the direct drive arrangement provides a rotatable platform 18 that can be stopped immediately upon receipt of a signal from the press control system.

In a current embodiment, the press 10 includes an NSK model 1410 servomotor 22, available from NSK Corporation. The motor 22 provides controlled movement or rotation of the turntable 18 between about 20 and about 60 revolutions per minute. It has been observed that with the NSK model 1410 servomotor 22, the turntable 18 can be rotated 180° in less than one second, and with four mold blocks 20 on the turntable, the output or throughput of the press 10 is anticipated to be between about 1,650 and 1,700 parts per hour.

The present direct drive assembly 16 provides a number of advantages over known indirect drive type arrangements. Specifically, known indirect drive systems utilize an arrangement of gears and/or belts to operably connect the drive motor to the turntable. While this method of drive may be effective, it does have its drawbacks. First, because of the nature of such an indirect drive system, after a "breaking-in" period, the drive system may require "fine-tuning" or adjustment in order to assure that the mold blocks are properly and accordingly positioned at their respective stations within the press 10. That is, in order to assure that the mold block is positioned immediately below the plastic injector at the injection station, the drive system may require adjustment after the "break-in" period. Likewise, in order to assure that the mold blocks are properly positioned at the other stations, the drive system may require further adjustment. This fine-tuning or adjustment may be required during the entire period of operation of the press.

In addition, such indirect drive systems naturally have some inertial movement upon receipt of a signal to stop movement of the turntable. That is, when a signal is generated by the apparatus control system to stop the turntable while the press is in motion, there is a natural tendency, as a result of momentum, for the turntable to continue rotating. Known indirect drive systems, because they include intermediary components between the turntable and the drive motor, permit at least some movement of the turntable upon receipt of such a stop signal. Advantageously, the present direct drive assembly 16 does not permit further movement of the turntable 18 upon receipt of a stop signal. Rather, the turntable 18 will immediately stop in its position upon receipt of an appropriate signal.

This enhanced control of the movement or motion of the turntable 18 provides a number of benefits. First, as will be recognized by those skilled in the art, such increased responsiveness provides increased personnel safety protection. In addition, increased responsiveness greatly reduces or eliminates the opportunity to damage the apparatus 10, and specifically the mold blocks 20 and injector 26, in the event that the blocks 20 do not open or close properly during operation.

In addition to providing enhanced control over turntable 18 movement, the direct drive assembly 16 also permits the use of a heavier, i.e., thicker, turntable 18 plate. Use of a thicker turntable 18 plate provides a number of advantages, including, as will be recognized by those skilled in the art, reduced flexing of the table 18 upon compression of the mold blocks 20 and injection of plastic therein. That is, during operation of the press 18, when the mold blocks 20 approach the injection station 26 and are positioned therein ready to receive the molten plastic, the mold blocks 20 and thus the turntable 18 are clamped by a hydraulically actuated clamp mechanism, indicated generally at 32, that clamps the mold block 20 between a clamp and an anvil, to provide sufficient pressure on the blocks 20 to assure that the plastic remains within the mold cavity 30. This clamping pressure can be on the order of about 12 tons to about 25 tons. Because this clamping pressure is quite significant, thinner turntable plates can flex as a result of this pressure. Thus, it will be appreciated that use of a thicker turntable plate 18 reduces the amount of and opportunity for flex resulting from the compression necessary to maintain the blocks 20 closed.

In order to provide increased assurance that the turntable 18 does not bind at the injection station 26 after clamping, i.e., after the plastic is injected into the mold blocks 20 and the clamp is released, the press 10 includes a hydraulic lift 34 that moves the turntable 18 away from the clamp 32 anvil to assure that it will freely rotate to the next indexing position or station. The lift 34 is configured to move the turntable 18 off of the anvil a small, yet sufficient distance to assure that the table 18 does not bind thereon. In a present embodiment of the press 10, the lift 34 moves the table 18 upward about twenty-thousandths of an inch. Although this may not appear to be a significant "lift" it has been shown to be sufficient to assure that the turntable 18 does not bind on the clamp 32 anvil.

In a current embodiment, the servomotor 22 is mounted on a lift table 36 that is mounted to the frame 12. The lift table 36 includes a stationary plate 38 that is rigidly mounted to the frame 12, and first and second, or upper and lower, movable plates 40, 42, respectively. The lower movable plate 42 is positioned between the stationary plate 38 and the upper movable plate 40. The lower movable plate 42 is operably connected to the stationary plate 38 by a lift cylinder 34 that is positioned on the stationary plate 38. The lower movable plate 42 is rigidly connected to the upper movable plate 40 by a plurality of, and preferably three, rigid struts 44. The struts 44 transfer the lift force from the cylinder/lower movable plate 34/42 to the upper movable plate 40.

In order to assure that the movable plates 40, 42 remain in alignment with one another and with the stationary plate 38, a plurality of, and preferably three, aligning struts 46 extend upwardly from the stationary plate 38 through openings 48 defined in the lower movable plate 42. In a current embodiment, the rigid struts 44 are equally circumferentially spaced from one another, i.e., 120° apart, and the aligning struts are likewise equally circumferentially spaced from one another, i.e., 120° apart. In this configuration, the aligning struts 46 and rigid struts 44 are positioned between their respective adjacent struts, 44, 46 such that the struts 44, 46 alternate, i.e., rigid-aligning-rigid-aligning, and are equally spaced 60° from respective adjacent struts 44, 46.

In a current embodiment, the servomotor 22 is mounted directly to the upper movable plate 40 and the turntable 18 is mounted directly to the servomotor 22. The aligning struts 46 maintain the lower movable plate 42 in alignment with the stationary plate 38, and the rigid struts 44 extending between the lower and upper movable plates 40, 42 maintain the lower and upper plates 42, 40 movable as a single unitary assembly, and in alignment with one another.

In order to properly control the operation of the press 10, the press 10 includes a programmable logic controller (PLC) 52. The PLC 52 which controls the movement of the turntable 18, the screw drives of the injection station 26, as well as the timing and various other aspects of operation, can be programmed to vary the time that the mold blocks 20 are presented to any particular station. In addition, the PLC 52 can be programmed to control the temperature of the mold blocks 20 as well as the various other temperature dependent and/or temperature sensitive operations of the press 10. In a current embodiment of the press 10, a control station 54 is mounted to the press 10 by a movable, pivotable extension or arm (not shown) so that the control station can be safely and ergonomically positioned for operation of the press 10.

The programmable controller 52 is preferably used to control the speed of rotation of the turntable 18, as well as the position of the mold blocks 20 at the various stations. As such, control signals for starting and stopping the turntable 18 are generated by the programmable controller.

In order to reduce personnel hazards associated with the press, the press can include a light curtain illustrated generally, in part, at 58. Typically, the light curtain 58 includes a plurality of upstanding elements that transmit and/or receive light signals from adjacent upstanding elements (three shown) 58a–c. In a known configuration, the upstanding elements 58a–c are positioned at about the corners of the top portion of the press 10, mounted above the lower cabinet 14, on which the turntable 18 is positioned. The light curtain 58 can be configured and programmed through the PLC 52 such that when the light is "broken" or interrupted by passage of anything through the curtain, the turntable 18 is automatically stopped. As such, in the event that an individual's hand or other object passes through the curtain and approaches the turntable 18, the PLC 52 can be programmed to generate a stop signal to immediately stop the turntable 18 regardless of the position of the turntable 18 and/or the mold blocks 20.

In a current embodiment, the light curtain 58 includes four upstanding elements (three shown) 58a–c, the elements being STI model MiniSafe B, commercially available from Wisconsin Controls. The elements 58a–c are operably, electronically connected to the PLC 52, with the PLC 52 programmed to stop the turntable 18 movement upon interruption of the light beams between the elements 58a–c.

In a current embodiment, the press 10 includes a Barber-Colman EL400 series controller 52. The Barber-Colman controller 52 is a complete closed loop controller 52 which provides for accuracy and repeatability in press 10 operations. As described above, the PLC 52 includes inputs and outputs to the various components of the press 10, including, but not limited to the servomotor 22, the light curtain 58, the heating elements on the barrel, the plastic injector 26 and the extruder screws and the lift 34. The PLC 52 can be further used, through the inclusion of other monitors, sensors and switches, to reduce or eliminate the potential for equipment damage as a result of, for example, a mold block 20 not opening or closing properly at a predetermined, desired location.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

We claim:

1. A rotary injection molding apparatus comprising:

a stationary frame;

a rotatable platform disposed on the stationary frame;

a drive assembly for rotatably driving the platform, the drive assembly including an indexing motor having a rotating portion being directly and rigidly operably connected to the platform to define a one-to-one relation between the rotation of the motor rotating portion and the rotatable platform;

a plurality of mold blocks located on the platform;

injection means for injecting a moldable material into the mold blocks; and a lift portion operably connected to the indexing motor and actuatable to raise and lower the rotatable platform relative to the injection means.

2. The rotary injection molding apparatus in accordance with claim 1 including a control system operably connected to the motor and operably connected to at least one sensor configured to generate a signal and transmit the signal to the control system to generate a stop signal to stop movement of the motor.

3. The rotary injection molding apparatus in accordance with claim 1 including a lift table mounted intermediate the frame and the indexing motor for raising and lowering the indexing motor relative to the frame.

4. The rotary injection molding apparatus in accordance with claim 3 wherein the lift table is operably connected to a lift cylinder.

5. The rotary injection molding apparatus in accordance with claim 4 wherein the lift cylinder is a hydraulic cylinder.

6. The rotary injection molding apparatus in accordance with claim 5 wherein the lift table includes a stationary plate and a pair of movable plates, the stationary plate having the lift cylinder positioned thereon between the stationary plate and an adjacent, lower movable plate, the movable plates being rigidly connected to one another by a plurality of rigid struts, the stationary plate including at least one aligning strut extending therefrom and extending through an opening defined in the lower movable plate.

7. The rotary injection molding apparatus in accordance with claim 6 including three rigid struts positioned circumferentially equally spaced from one another and including three aligning struts circumferentially equally spaced from one another, wherein the aligning struts and rigid struts are positioned in alternating arrangement, and wherein each aligning strut and each rigid strut is positioned circumferentially equally between its respective adjacent struts.

8. The rotary injection molding apparatus in accordance with claim 1 wherein the indexing motor is a servomotor.

* * * * *